(12) United States Patent
Mayr

(10) Patent No.: US 10,233,977 B2
(45) Date of Patent: Mar. 19, 2019

(54) CLUTCH ASSEMBLY AND DRIVE ASSEMBLY HAVING A CLUTCH ASSEMBLY

(71) Applicant: GKN Driveline Bruneck AG, Bruneck (IT)

(72) Inventor: Nikolaus Mayr, Bruneck (IT)

(73) Assignee: GKN Driveline Bruneck AG, Bruneck (IT)

( * ) Notice: Subject to any disclaimer, the term of this patent is extended or adjusted under 35 U.S.C. 154(b) by 0 days.

(21) Appl. No.: 15/513,700

(22) PCT Filed: Sep. 14, 2015

(86) PCT No.: PCT/EP2015/070972
§ 371 (c)(1),
(2) Date: Mar. 23, 2017

(87) PCT Pub. No.: WO2016/046011
PCT Pub. Date: Mar. 31, 2016

(65) Prior Publication Data
US 2017/0298996 A1    Oct. 19, 2017

(30) Foreign Application Priority Data
Sep. 25, 2014  (DE) .......................... 10 2014 113 937

(51) Int. Cl.
*B60K 17/02* (2006.01)
*B60K 23/08* (2006.01)
(Continued)

(52) U.S. Cl.
CPC .............. *F16D 11/14* (2013.01); *B60K 17/02* (2013.01); *B60K 17/3462* (2013.01);
(Continued)

(58) Field of Classification Search
None
See application file for complete search history.

(56) References Cited

U.S. PATENT DOCUMENTS

| 2,297,390 A | 9/1942 | Burger | |
|---|---|---|---|
| 9,719,563 B2 * | 8/2017 | Hirao | ........................ F16C 3/02 |

(Continued)

FOREIGN PATENT DOCUMENTS

| CN | 201827223 U | 5/2011 |
|---|---|---|
| DE | 2052244 A1 | 5/1971 |

(Continued)

OTHER PUBLICATIONS

International Search Report and Written Opinion for PCT/EP2015/070972 dated Apr. 29, 2016 (21 pages).

(Continued)

*Primary Examiner* — Jacob S. Scott
(74) *Attorney, Agent, or Firm* — Bejin Bieneman PLC

(57) ABSTRACT

A clutch assembly comprises a first drive part, a second drive part, a clutch which comprises an axially supported first clutch part and an axially movable second clutch part, wherein the second clutch part can be moved into an open position and into a closed position, wherein a clutch profile of the second clutch part 8 and a drive part profile of the second drive part form a form-locking profile connection such that the second clutch part is connected to the second drive part in a rotationally fixed and axially movable way, wherein the drive part profile comprises central flank lines which are each formed between a tip line and a base line of the drive part profile, wherein the drive part profile is designed such that the central flank lines, when rotating around the rotational axis A, define a rotational face which comprises at least one tapered partial portion. Further disclosed is a driveline assembly with such a clutch assembly.

15 Claims, 9 Drawing Sheets

(51) Int. Cl.
  *F16D 11/14* (2006.01)
  *F16D 23/12* (2006.01)
  *B60K 17/346* (2006.01)
  *F16D 28/00* (2006.01)
  *B60K 17/35* (2006.01)
  *F16D 11/00* (2006.01)

(52) U.S. Cl.
  CPC .............. *B60K 23/08* (2013.01); *F16D 28/00* (2013.01); *B60K 17/3515* (2013.01); *B60Y 2400/421* (2013.01); *F16D 2011/002* (2013.01); *F16D 2011/008* (2013.01); *F16D 2023/123* (2013.01)

(56) References Cited

U.S. PATENT DOCUMENTS

2016/0281792 A1* 9/2016 Shiotsu .................. F16D 25/02
2016/0333954 A1* 11/2016 Lindberg ............. F16D 65/186

FOREIGN PATENT DOCUMENTS

| DE | 19804071 A1 | 8/1999 |
| DE | 19839154 C1 | 6/2000 |
| DE | 10243279 A1 | 3/2004 |
| DE | 102008037886 A1 | 2/2010 |
| DE | 10 2009 012463 B3 | 11/2010 |
| DE | 102009056088 A1 | 9/2011 |
| EP | 1016801 A1 | 7/2000 |
| WO | 2010017882 A1 | 2/2010 |

OTHER PUBLICATIONS

International Preliminary Report on Patentability for PCT/EP2015/070972 dated Dec. 14, 2016 (8 pages).
Written Opinion of the Authority Responsible for the International Preliminary Examination for PCT/EP2015/070972 dated Aug. 12, 2016 (14 pages).
Partial Search Report for PCT/EP2015/070972 dated Dec. 10, 2015 (7 pages).

* cited by examiner

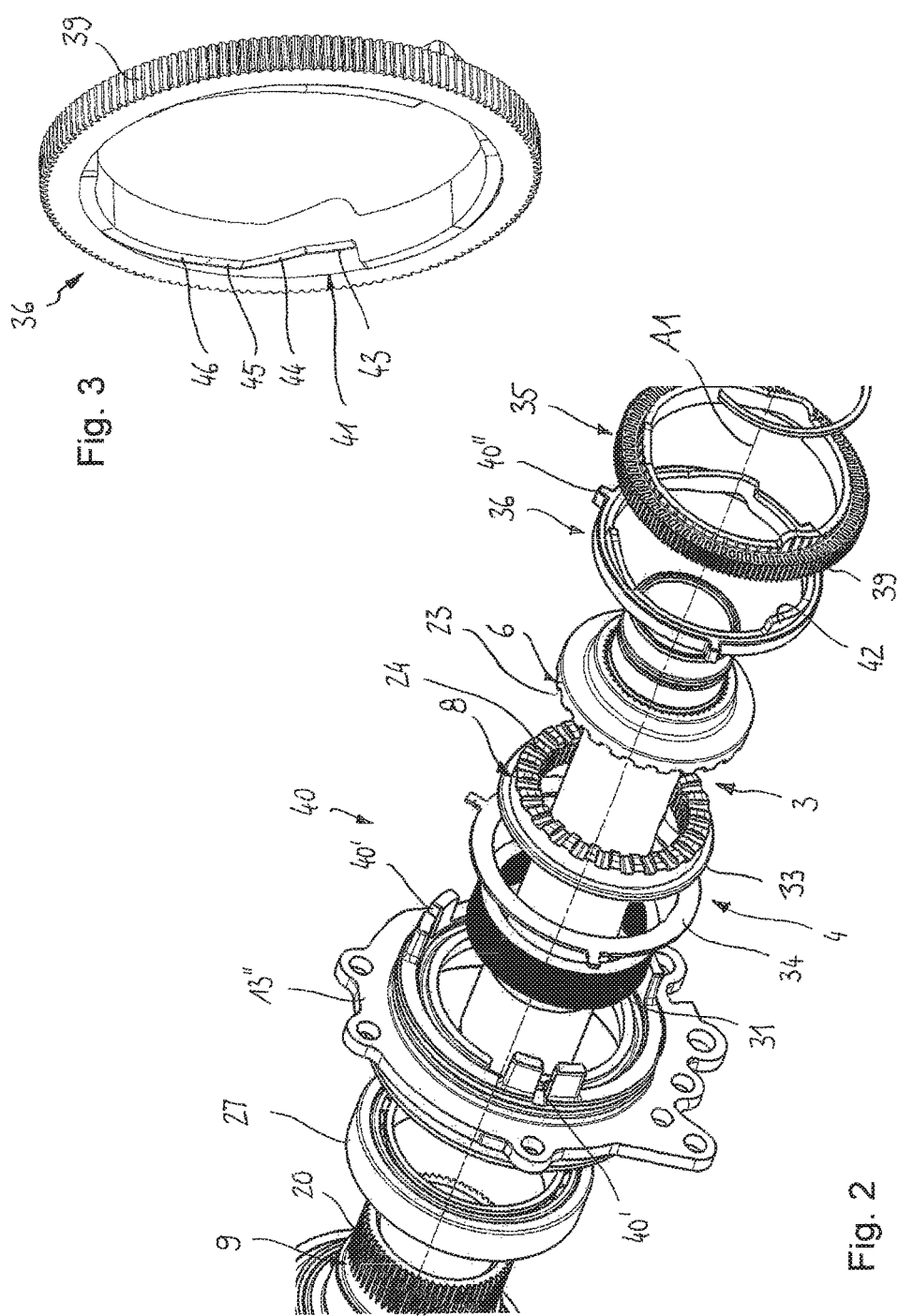

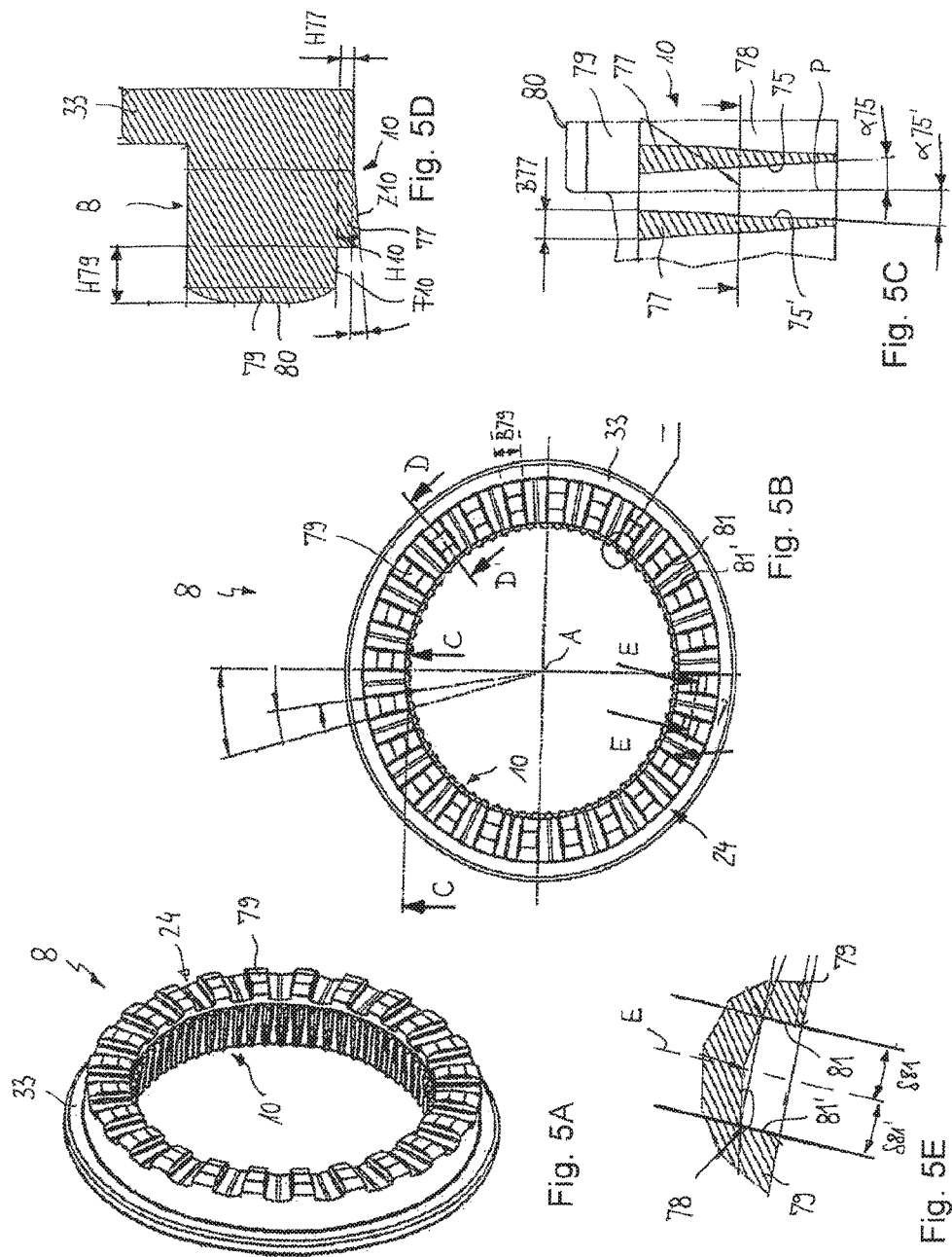

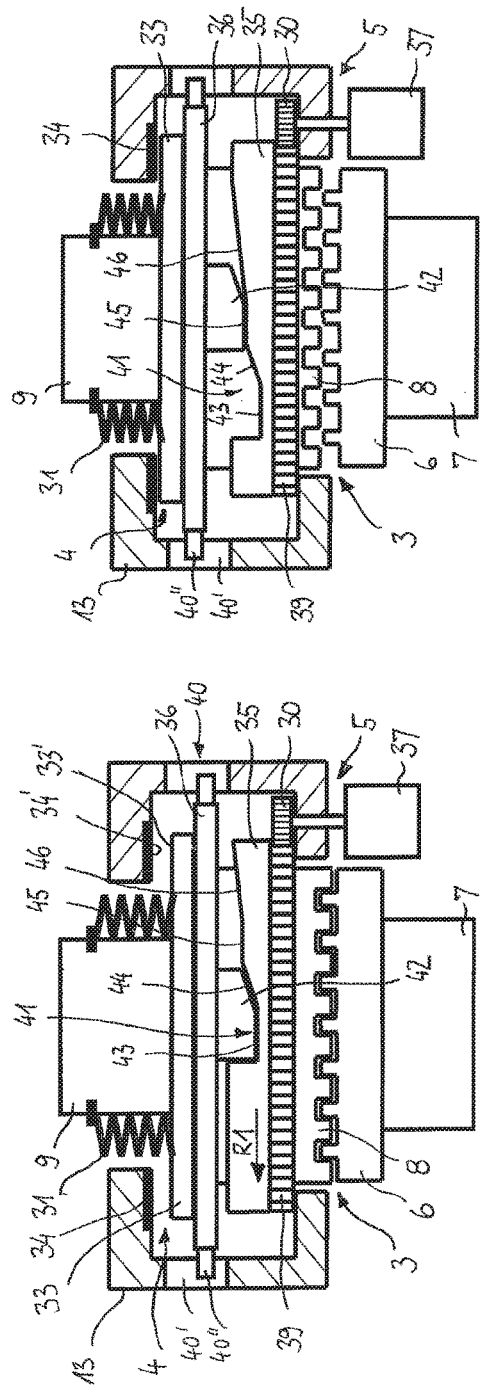
Fig. 8
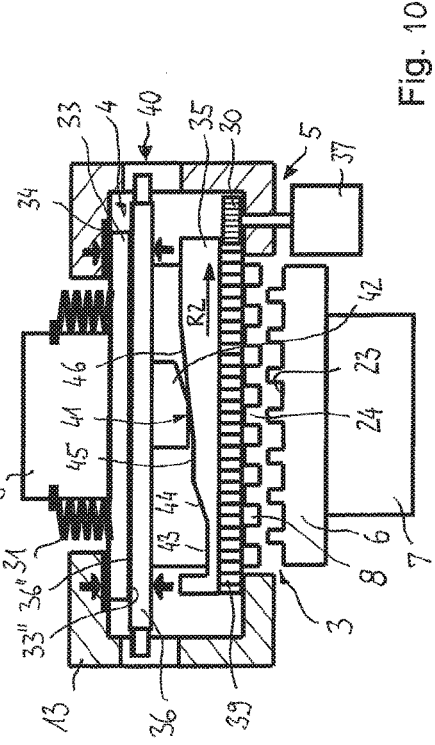
Fig. 9
Fig. 10

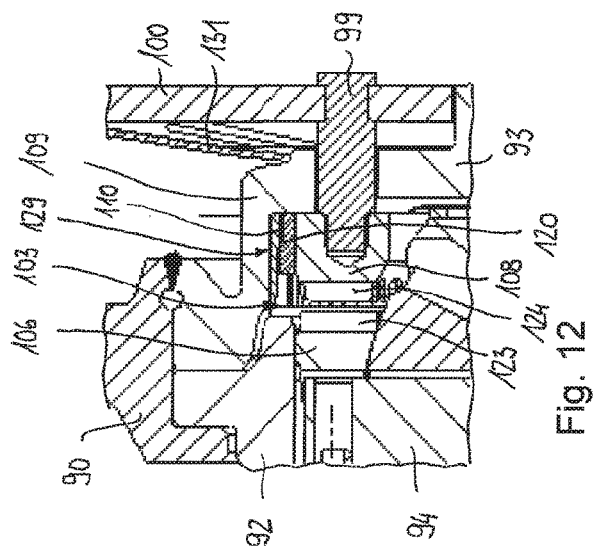

CLUTCH ASSEMBLY AND DRIVE ASSEMBLY HAVING A CLUTCH ASSEMBLY

CROSS-REFERENCE TO RELATED APPLICATIONS

This application is a national stage of, and claims priority to, Patent Cooperation Treaty Application No. PCT/EP2015/070972, filed on Sep. 14, 2015, which claims priority to German Application No. DE 10 2014 113 937.2 filed on Sep. 25, 2014, each of which applications are hereby incorporated herein by reference in their entireties.

Clutch assemblies are used for example in the drivelines of multi-axle motor vehicles, in particular in drivelines with a permanently driven first driving axle and an optionally drivingly connectable second driving axle. Such drive concepts with an optionally drivingly connectable driving axle are referred to as "hang-on", "on demand" or "disconnect" systems. Generally speaking, a difference is made between different drive concepts for motor vehicles. For example, there are motor vehicles with a front engine, with the front axle being permanently driven and the rear axle being drivingly connectable. Furthermore, there are front axle vehicles in which the rear axle is driven permanently, with the front axle being drivingly connectable. Finally, there are rear engine vehicles with the rear axle being permanently driven and the front axle is drivingly connected via a hang-on clutch if required.

From DE 10 2009 012 463 B3 an angle drive assembly is known with a controllable clutch for the driveline of a motor vehicle. The clutch is provided as a form-locking clutch and comprises two clutch parts with an outer toothing which, via an axially displaceable switching sleeve, can be connected to each other in a rotationally fixed way. In the closed condition, torque is transmitted to the optionally drivable driving axle. When the clutch is in the open condition, the transmission of torque is interrupted.

From DE 10 2008 037 886 A1, corresponding to WO 2010/017882 A1, a drive assembly for a multi-axle driven motor vehicle is known, having a permanently driven first driveline and an optionally drivable second driveline. The second driveline comprises a first clutch which, in the power path, is arranged in front of the propeller shaft and a second clutch which, in the power path, is arranged behind the propeller shaft. The propeller shaft can be disconnected so as to be torque-free by opening the first and the second clutch.

DE 102 43 279 A1 proposes a clutch with conical toothing of a shaft-hub connection for transmitting torque between a crankshaft of an engine and a gearbox. A conical toothing of a shaft is inserted into the conical toothing of a hub, wherein the hub is axially loaded towards the shaft by a spring, so that a rotationally play-free force-locking connection is formed.

From DE 10 2009 056 088 A1 a differential assembly is known with a driving gear, a differential drive and a clutch arranged in the power path between the driving gear and the differential drive for optionally transmitting torque from the driving gear to the differential. Furthermore, an electromagnetic actuator is provided for operating the clutch, a sensor for determining the switching positions of the clutch and a target element cooperating with the sensor.

From DE 198 04 071 A1 there is known a switchable claw clutch with two rotatably arranged clutch parts. One of the clutch parts is axially displaceable and the other clutch part is held axially fixed. To reduce the load on the claws when engaging the clutch, one of the clutch parts comprises a cam which can slide on a face-sided supporting face of the other clutch part. The supporting face is provided with a recess into which the cam is engagable within a limited angle range.

Disclosed herein is a clutch assembly which ensures that an optionally drivable driveshaft can be securely connected and disconnected and which can be produced easily and cost-effectively. Further discloses is a drive assembly with such a clutch assembly.

A solution is provided by a clutch assembly, in particular for being used in a driveline of a motor vehicle, comprising: a first drive part, a second drive part, a clutch which comprises an axially supported first clutch part and an axially movable second clutch part, wherein the second clutch part is movable into an open position in which the first and the second clutch part are freely rotatable relative to each other around a rotational axis, and into a closed position in which the first and the second clutch part form-lockingly engage each other for transmitting torque, wherein a clutch profile of the second clutch part and a drive part profile of the second drive part form a form-locking profile connection such that the second clutch part is connected to the second drive part in a rotationally fixed and axially movable way, wherein the drive part profile of the second drive part profile comprises central flank lines which are each formed between a tip line and a base line of the drive part profile, wherein the drive part profile is designed such that the central flank lines, when rotating around the rotational axis, define a rotational face which comprises at least a tapered partial portion, wherein the clutch profile and the drive part profile are formed such that upon torque transmission an axial force is exerted from the second drive part onto the second clutch part towards the first clutch part.

The clutch profile can include a central flank line of a clutch profile element of the clutch profile that, when rotating around the rotational axis, defines a rotational face of which at least a partial portion is tapered in axial direction. Generally it applies for the present disclosure that all the details described for the drive part profile can also apply to the clutch profile and vice versa. The term "a" (for example "a central flank line") is always used as an indefinite article and is intended to include one, several or all the respective elements. The rotational face of the drive part profile, which face is tapered at least in a portion, and the associated rotational face of the clutch profile respectively, are orientated such that an axial force acting from the second drive part upon the second clutch part when torque is transmitted, is effective in the closing direction of the clutch.

An advantage of the present clutch assembly is that it can be produced easily and cost-effectively. This is due to the design of the profile connection whose drive part profile elements and/or the clutch profile elements comprise central flank lines which are positioned on a rotational face which is tapered in the axial direction and/or, if viewed in a longitudinal section, which approach the rotational axis. This allows the profiles to be produced in particular by a forming production method, wherein a subsequent chip-forming operation may not be necessary. "Profile connection" is intended to mean that, in a cross-section, the drive part and the clutch part each comprise non-circular profile, which profiles engage one another in a form-fitting way. The clutch part is axially plugged onto the second drive part, which is the reason why the connection formed by the two components can also be referred to as a plug-in connection.

The centre flank line of the respective profile is the line which extends centrally along a profile flank between the tip line and the base line of the profile element. Geometrically, the flank line of the shaft profile, upon rotation, forms a rotational face around the rotational axis, wherein it is proposed that the radius between the rotational axis and the rotational face is variable in the longitudinal direction and decreases at least in a portion along the shaft profile in the axial direction. A corresponding design applies to a flank line of the clutch profile. In this way, an axial force is generated in the closing direction of the clutch when torque is transmitted between the second clutch part and the second drive part, so that, as the case may be, any holding forces for holding the clutch in the closed position are low.

The profile or plug-in connection shall include any example which permits a form-fitting engagement for transmitting torque while at the same time permitting axial movability, in particular also splined connections, notch connections, polygon profile connections as well as a combination of same. Independently of the design of the profile connections, it is proposed that the drive part profile and/or the clutch profile are tapered towards the first clutch part. This means that the rotational face formed by a central flank line is tapered towards the first clutch part, which at the same time means that the height of the profile elements increases towards the first clutch part. Alternatively or in addition, this also means that individual profile elements of the profile connection are tapered towards the first clutch part.

The assignment of the outer profile and the inner profile to the drive part and the clutch part can generally be freely selected. According to a first possibility, the drive part comprises the outer profile including the outer teeth, whereas the clutch part comprises the corresponding inner profile including the inner teeth. In this case, the drive part can be provided for example in the form of a driveshaft or a shaft journal, wherein the drive part profile can be provided in the form of a shaft profile then. According to a second example, the kinematic reversal is also possible, i.e. the drive part comprises the inner profile whereas the clutch part comprises the outer profile. In this case, the drive part can be provided for example in the form of a hollow member or hollow gear, wherein the drive part profile would have the form of a hub profile.

The clutch profile elements and the drive part profile elements are designed such that, when torque is transmitted, an axial force is applied by the second drive part to the second clutch part towards the first clutch part. As a result of the axial force applied by the profile connection in the closing sense, an undesirable opening of the clutch during the transmission of torque is prevented. In particular, it is proposed that an axial force that acts from the profile teeth in the closing sense during the transmission of torque is greater than an axial force that possibly acts from the clutch in the opening sense during the transmission of torque.

In order to generate axial force components and, respectively, to achieve an easy production of the profile connection, it is proposed that at least one profile flank of one or several or all drive part profile elements—if viewed in the cylindrical section through the profile teeth—enclose a profile flank angle with a parallel to the rotational axis which angle is greater than 1° and/or smaller than 5°, wherein values in excess of 5° are not excluded. The same applies analogously to the clutch profile, i.e., the profile flanks of the clutch teeth enclose clutch flank angles with a parallel to the rotational axis, which angles correspond to the profile flank angles. In an example, all drive part profile elements are equally formed and are uniformly distributed around the circumference. This can also apply to the clutch profile engaging the drive part profile.

According to an example, the first clutch part comprises first engaging elements which, in the closed condition of the clutch, form-fittingly engage corresponding second engaging elements of the second clutch part. The first and the second engaging elements contact one another at engaging faces for transmitting torque between the two clutch parts. In particular, it is proposed that at least one of the engaging faces—if viewed in a cylindrical section through the engaging elements—includes an engaging face angle with a longitudinal plane containing the rotational axis. The engaging face angle can be smaller than the profile flank angle of the profile connection and for example amounts to 0° to 1°, with larger angles also being possible. Because the profile flank angles of the profile connection are greater than the engaging face angles of the clutch engaging elements, the clutch is safely held in the closed condition during the transmission of torque.

According to an example, the profile connection is provided in the form of a splined connection with inter-engaging shaft splines and clutch splines, with the shaft splines and the clutch spines comprising at least one conical partial face. The conical partial face can be a face which, upon rotation, is formed by the tooth base lines or the tooth tip lines of the drive part splines and clutch splines respectively.

According to a first example in which the drive part comprises an outer profile and the clutch part comprises a corresponding inner profile, the drive part profile comprises a plurality of circumferentially distributed profile elements for which preferably one of the following applies: the profile elements, along their length, comprise a variable width which decreases towards the first clutch part; the profile elements form tooth tip lines of the drive profile, wherein the tooth tip lines are arranged on a cylindrical outer face of the second drive part; and/or between the profile elements there are formed profile gaps, wherein the profile gaps, along their length, comprise a variable depth which increases towards the first clutch part. Because the width of the profile elements decreases along the drive part profile towards the clutch part, the width of the profile gaps positioned between two adjoining profile elements increases accordingly. Just like the increase in depth of the profile gaps towards the first clutch part, this example permits a simple production by forming operation because the conical faces formed in this way can easily be removed from their mould. Accordingly, one of the following applies to the design of the clutch profile: the clutch profile elements, along their length, comprise a variable width which increases towards the first clutch part; the profile tip lines of the clutch profile elements form a tip line face which is conically tapered towards the first clutch part; the clutch profile elements, along their length, comprise a variable height which increases towards the first clutch part. The clutch profile and the shaft profile thus correspond to one another, so that they can easily engage one another, with the largest possible contact faces contacting one another for transmitting torque. (FIGS. 1-10)

According to a second example wherein the drive part comprises an inner profile and the clutch part the corresponding outer profile, at least one of the following applies to the profile elements of the drive part: the profile elements, along their length, comprise a variable width which decreases towards the first clutch part; the profile elements form teeth tip lines of the drive profile, wherein the teeth tip lines are arranged on a conical inner face of the second drive part; between the profile elements there are formed profile gaps, with the profile gaps, along their length, comprising a variable depth which increases towards the first clutch part. Accordingly, one of the following applies to the design of the clutch profile: the clutch profile elements, along their length, comprise a variable width which increases towards the first clutch part; tip lines of the clutch profile elements form a tip line face which widens conically towards the first clutch part; the clutch profile elements, along their length, comprise a variable height which decreases towards the first clutch part. (FIGS. 11-13)

It applies to all the above-mentioned examples that the drive part profile can be produced by press-forming. For press-forming, a forming die is used having a contour which corresponds to the drive part profile to be produced and which is axially pressed on to the drive part, respectively, the drive part is pressed into the forming die. Alternatively, the drive part profile can be produced by milling, for example by hobbing. For this purpose, the rotational axis of the milling tool can be moved on a forward feed axis which extends at an angle relative to the rotational axis of the drive part, and encloses with same an angle of for example 3° to 8°. The first and/or the second clutch part can be produced by bulk forming in the form of a precision-formed component. Due to the selected geometry, there is no need for a subsequent chip forming operation.

According to an example, the engaging elements of the clutch are provided in the form of face toothings, which, in the closed condition of the clutch, engage one another in a form-locking way. The term "face toothing" shall include any kind of form-fitting elements which are provided in opposed end faces of the two clutch parts. In particular, these can be inter-engaging claws or crown toothings. At least one of the following applies to the face toothings: face teeth of the face toothing, along their length, comprise a variable width which increases radially outwardly; the face teeth, along their length, comprise a variable height which, in a central region, comprise a maximum and which, starting from the maximum, decreases radially inwardly and radially outwardly; and/or the tooth flanks of the face teeth extend at an angle relative to one another.

According to a further example, which applies in particular to the first example, the clutch assembly comprises a brake by means of which the second drive part can be braked relative to a stationary component, as well as an actuating device by means of which the clutch and the brake can be actuated. In particular, it is proposed that the actuating device serves for actuating both the clutch and the brake. An advantage of the clutch assembly having an integrated brake is that a driveshaft positioned in the power path downstream the clutch can be actively braked if the clutch is in the open condition. In this way, any drag torque and friction losses caused by driveshaft rotation in the load-free condition can be reduced. In case the driveline comprises a friction plate clutch, this can be quickly de-oiled by braking the driveshaft, which also reduces drag moments and friction losses.

The actuating device can be designed such that initially the clutch is at least partially or completely opened, with the brake being closed subsequently. The brake can be designed such that the second drive part can be fully braked relative to the stationary component, i.e., that it no longer rotates. Braking of the second drive part is effected at least indirectly relative to the stationary component, i.e., directly by friction contact with the stationary component, or indirectly by interposing one or more further components. The stationary component can be a housing part of the clutch assembly or a component firmly connected to the housing.

The actuating device for actuating the clutch and the brake, respectively, can in principle have any design. For example, electromotive, electromagnetic, hydraulic or pneumatic actuators can be used which can be controlled by an electronic control unit. According to an example, there is provided one single actuating device which actuates both the clutch and the brake. However, it is understood that in principle separate actuators can also be used.

According to a possible example, the actuating device comprises a ramp mechanism with a first ring, which is axially supported relative to a stationary component and thus can also be referred to as a supporting ring and a second ring which is axially movable by relatively rotating the two rings relative to each other and which thus can also be referred to as a setting ring. Relative rotation in that context means that either only one of the two rings is rotated, whereas the respective other ring is held rotationally fixed relative to the stationary component, or that both rings are rotated relative to one another. In as far a direction of rotation is mentioned, this refers to the relative rotation of the two rings relative to one another, independently of whether only one ring or both rings are rotated.

With respect to the design of the rings, at least one of the following can apply: the first ring is rotatingly drivable around a rotational axis relative to the stationary component by a drive and/or the second ring is rotationally fixed relative to the stationary component. This includes in particular the following possibilities: the first ring is axially supported and rotatingly drivable, and the second ring is held in an axially displaceable and rotationally fixed way; the first ring is axially supported and rotationally fixed and the second ring is axially displaceably and rotatingly drivable; or the first ring is axially supported and the second ring is axially displaceable and both rings are rotatingly drivable. The drive could be any type of drive, for example an electric, hydraulic or pneumatic drive.

According to an example, the ramp mechanism is designed such that—starting from an end position in which the first ring and the second ring are approximated to each other—by relatively rotating the two rings relative to one another in a first rotary range, the clutch is opened and further, if rotation continues in the same relative rotational direction in a second rotary range, the brake is closed. For this, at least one of the two rings can comprise a setting contour with a variable height in the circumferential direction, against which setting contour the other ring is axially supported. To achieve uniform axial support, the supporting ring and the setting ring comprise three or more circumferentially distributed setting contours and counter contours, respectively, wherein, however, one or two contours would also be possible. The setting contours and counter contours can be directly axially supported against one another. However, the actuating device can also be provided in the form of a ball ramp assembly. In this case both rings each comprise ball grooves with variable depths in the circumferential direction, with always one ball being arranged in two opposed ball grooves via which the rings are support against each other indirectly. Alternatively, the actuating device can also comprise a roller assembly, wherein the two rings comprise rolling faces on which, in particular cylindrical rolling members are supported.

For opening and closing the clutch and the brake respectively, generally two examples of the actuating device are possible. According to a first possibility the opening of the clutch and the closing of the brake are effected by relatively rotating the two rings in a first relative direction of rotation, whereas the closing of the clutch respectively the opening of the brake are effected by relatively rotating the two rings in an opposed second direction of rotation. According to a second possibility, the opening of the clutch respectively the closing of the brake, and the closing of the clutch respectively the opening of the brake are effected by relatively rotating the two rings in one and the same direction of rotation.

The brake can comprise a first brake part which is connected to the second clutch part, and a second brake part which is axially supported on the stationary component. By means of the actuating device the first brake part can be moved into friction contact with the second brake part in order to be braked relative there to. To achieve a particularly compact and simple design it is advantageous if the first and the second brake part are produced in one piece. However, it is understood that said components can also be produced as separate parts and can then be connected to each other. For actuating the brake, the first brake part, together with the second clutch part, is loaded towards the second brake part. The second clutch part and the second drive part connected thereto are braked by friction contact between the two brake parts.

Releasing the brake again can be effected by relatively rotating the first ring relative to the second ring in an opposed direction of rotation, i.e., from the second range of rotation back to the first range of rotation. In this case, the setting contour can comprise a first ramp portion with a first gradient for opening the clutch and a second ramp portion with a greater second gradient for closing the brake. Between the first and the second ramp portion there can be provided an intermediate portion whose gradient can be zero. Alternatively, the process of opening the brake again can be effected by a further relative rotation of the first ring relative to the second ring in the same direction of rotation beyond the second range of rotation.

According to an arrangement which applies to all examples, there is provided a returning spring to which at least one of the following applies: the returning spring loads the brake in the opening sense and/or the returning spring loads the clutch in the closing sense. Generally, however, a reversed arrangement is also possible, in which the returning spring is effective in the closing sense of the brake and/or in the opening sense of the clutch. In this case the actuating device would also be effective in the reversed direction, i.e., against the spring force.

According to a possible example, the clutch assembly can also comprise an angle drive or can be part of an angle drive assembly which is also referred to as PTU (Power Take-off Unit). The angle drive comprises a ring gear and a bevel gear which meshingly, engage one another to transit torque, with the second drive part being firmly connected to the ring gear and being rotatably supported coaxially relative to the first drive part.

According to an example, the second drive part can be provided in the form of a differential housing which is rotably drivable by a drive gear around the axis of rotation, and the first drive part can be provided in the form of a differential carrier which is arranged in the differential housing so as to be rotatable around the rotational axis; wherein the clutch is arranged in the power path between the differential housing and the differential carrier, so that a transmission of torque from the differential housing to the differential carrier can relatively be effected or interrupted; wherein the first clutch part of the clutch is attached to the differential carrier and the second clutch part of the clutch is held in a rotationally fixed and axially movable way relative to the differential housing; wherein an actuating device is provided for actuating the clutch. In this example, it is also possible that the second clutch part comprises an annular portion which is arranged in the differential housing, and a plurality of connecting elements which extend axially from the annular portion and outwardly through apertures in the differential housing, wherein the clutch profile is formed on an outer circumferential face of the second clutch part, and wherein the drive part profile is formed on an inner circumferential face of the differential housing. (FIGS. 11 to 13.)

Further, a driveline assembly for a motor vehicle can comprise a permanently drivable first driveline with a first driving axle; an optionally drivable second driveline with a second driving axle, wherein the second driveline comprises a first clutch assembly, a second clutch assembly and a driveshaft which is arranged in the power path between the first and the second clutch assembly, wherein at least one of the first and the second clutch assemblies comprises one or more of the above-mentioned examples. In the closed position of the first and the second clutch, the driveshaft transmits torque to the second driving axle. An advantage of said driveline is that in the open condition of the two clutches the driveshaft arranged between the first and the second clutch assemblies can be switched off completely, which leads to a reduction in undesirable friction losses. The profile connection ensures an easy production and assembly and, because of the axial forces as generated, undesirable opening of the clutch is prevented.

The driveline assembly can comprise a transfer case which distributes torque introduced by the drive unit to the first and the second driveline, wherein the first driveline is permanently drivingly connected to the transfer case to transmit torque to the first driving axle, and the second driveline can be optionally drivingly connected to the transfer case to transmit torque to the second driving axle when required. The driveshaft can be a propeller shaft which is arranged in the torque flow between the transfer case and the second driving axle. The first clutch assembly can be arranged in the power path between the transfer case and the propeller shaft, and the second clutch assembly can be arranged in the power path between the propeller shaft and the rear axle differential. The first and/or the second clutch assembly can be provided in accordance with one or more of the above-mentioned examples.

In the drawings:

FIG. 2 shows the clutch assembly according to FIG. 1 in an exploded three-dimensional view;

FIG. 3 shows the first ring of the clutch assembly according to FIG. 1 in the form of a detail in an perspective view;

FIG. 5A shows the second clutch part of the clutch assembly according to FIG. 1 in a three-dimensional illustration;

FIG. 5B shows the second clutch part of the clutch assembly according to FIG. 1 in an axial view;

FIG. 5C shows the second clutch part of the clutch assembly according to FIG. 1 according to sectional line C-C of FIG. 5B;

FIG. 5D shows the second clutch part of the clutch assembly according to FIG. 1 according to sectional line D-D of FIG. 5B;

FIG. 5E shows the second clutch part of the clutch assembly according to FIG. 1 according to sectional line E-E of FIG. 5B;

FIG. 8 shows schematically the clutch assembly according to FIG. 1 in a first switching position;

FIG. 9 shows schematically the clutch assembly according to FIG. 1 in a second switching position;

FIG. 10 shows schematically the clutch assembly according to FIG. 1 in a third switching position;

FIG. 11 shows a further example clutch assembly in a longitudinal section;

FIG. 12 shows the clutch according to the clutch assembly of FIG. 11 as a detail;

Figure 1:
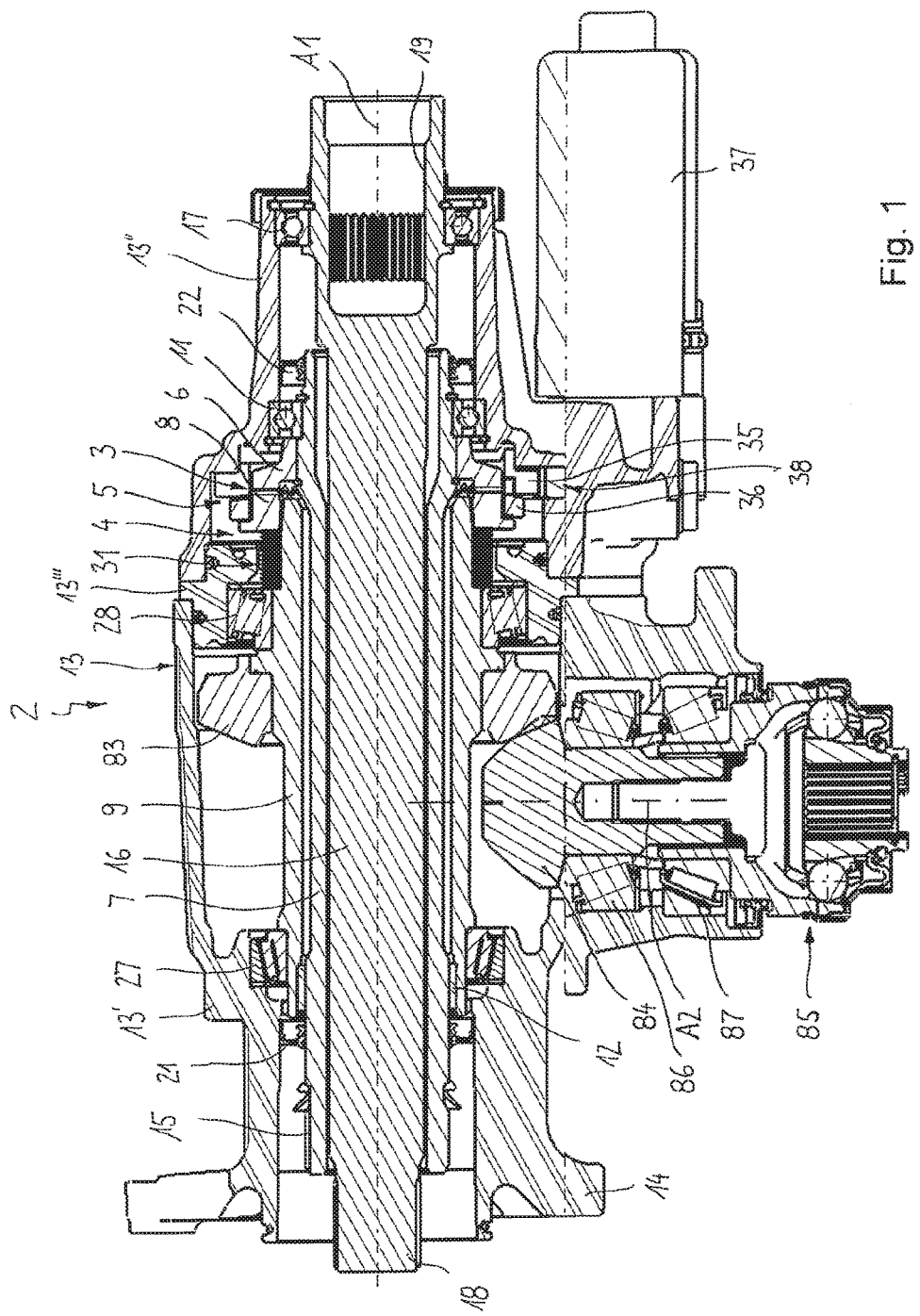
FIG. 1 shows a first example clutch assembly in a longitudinal section.

FIGS. 1 to 10 will be described jointly below. They show an example clutch assembly 2. The clutch assembly 2 is intended to be used in the driveline of a motor vehicle for optionally driving a driving axle of the motor vehicle. In particular, the clutch assembly 2 can be used for a multi-axle driven motor vehicle, which comprises a permanently driven primary driving axle and an optionally drivable secondary driving axle.

The clutch assembly 2 comprises a clutch 3 by which a transmission of torque in the driveline can be effected or interrupted; a brake 4 by which a part of the driveline can be braked relative to a stationary component when the clutch 3 is open; as well as an actuating device 5 by which the clutch 3 and the brake 4 can be actuated. The actuating device 5 is configured such that the clutch 3 and the brake 4 can be actuated independently from each other, which will be explained in greater detail below.

The clutch 3 comprises a first clutch part 6 which is connected to the first drive part 7 in a rotationally fixed way, as well as a second clutch part 8 which is connected to a second drive part 9 in a rotationally fixed way. In the present example, the first and the second drive part 7, 9 are provided in the form of driveshafts and are thus also referred to as such. It is to be understood however that the drive parts 7, 9 can also be designed differently, for example as a driving gear or a drive sprocket. By means of the actuating device 5, the first clutch part 6 and the second clutch part 8 can be made to engage each other to transmit torque, or they can be disconnected from one another, so that a transmission of torque is interrupted. The first drive part 7 is provided in the form of a hollow shaft which, by two bearings 11, 12, is rotatingly supported relative to a stationary housing around a rotational axis A. The housing 13 comprises a connecting portion 14 for being connected to a further component of the driveline, in particular a transmission. For introducing torque into the first driveshaft 7, the latter has appropriate splines 15 which can engage corresponding counter splines in a rotationally fixed way.

A through-driveshaft 16 is arranged coaxially within the first driveshaft 7. The through-driveshaft 16 is rotable relative to the first driveshaft 7 around the rotational axis A, and is rotably supported relative to the stationary housing 13 by a further bearing 17. At its first end 18, the through-driveshaft 16 comprises shaft splines for being drivingly connected to a connecting part, and at its opposed second end 19, it comprises hub splines for drivingly connecting a further drive component to be connected therewith. The annular space formed between the first driveshaft 7 and the housing 13 is sealed via a first seal 21 at the first end of the driveshaft 7 and a second seal 22 at the second end of the driveshaft 7.

The clutch 3 is provided in the form of a form-locking clutch, with the first clutch part 6 comprising first engaging elements 23 which can be made to form-fitting engage corresponding engaging elements 24 of the second clutch part 8. The first and the second engaging elements 23, 24 are provided in the form of face toothings. Thus, the clutch 3 can also be referred to as a tooth or claw clutch. However, it is to be understood that other types of clutches can also be used which are able, optionally, to effect or interrupt a transmission of torque.

The first and second engaging elements 23, 24 contact one another in the circumferential direction via lateral engaging faces which can also be referred to as contact faces, so that torque can be transmitted between the two clutch parts 6, 8. As can be seen in particular in FIG. 5E), the contact faces—if viewed in a cylindrical section through the engaging elements 23, 24—extend parallel to a longitudinal plane EL containing the rotational axis A, or, together with same, enclose a small contact face angle $\delta 81$, $\delta 81'$, i.e. the contact face angle 81, 81' preferably amounts to at least 0° and at most of 2° and can range between 1° and 2°, in particular.

Via the bearing 11, the first clutch part 6 is axially supported on the stationary housing 13 and via a shaft connection 25 it is connected to the first driveshaft 7 in a rotationally fixed way. A securing ring 26 secures the first clutch part 6 on the first driveshaft 7 in the opposite axial direction.

The second clutch part 8 is connected to the second drive part 9, respectively driveshaft, in a rotationally fixed and axially movable way. The second driveshaft 9 is supported by bearings 27, 28 so as to be rotatable in the housing 13 around the rotational axis A. Axial support for the second shaft 9 is effected via the second bearing 27 in the housing 13. The rotationally fixed connection between the second clutch part 8 and the second driveshaft 9 is effected via a profile connection 29 which will be explained in greater detail below, wherein the second clutch part 8 is axially movable relative to the second driveshaft 9. Via spring means 31, the second clutch part 8 is indirectly axially supported on the fixed housing 13, indirectly in that the spring means 31 are supported on a supporting face 32 of the second driveshaft 9, which, in turn, is axially supported via the bearing 27 in the housing 13. The spring means 31 are mounted with axial pretension and load the second clutch part 8 in the sense of closing the clutch 3. They act against the actuating force of the actuating device 5, so that they can also be referred to as a returning spring 31. In the present example, the spring means 31 are provided in the form of a spiral spring made of strip material, but other types of spring such as a spring package composed of plate springs can also be used.

Below the special features of the profile connection 29 between the second clutch part 8 and the second drive shaft 9 will be discussed in greater detail. The profile connection 29 comprises an inner clutch profile 10 provided at the second clutch part 8 and an outer shaft profile 20 provided at the second driveshaft 9, which profiles 10, 20 engage one another in a form-locking way. The clutch profile 10 is provided in the form of teeth which can also be referred to as clutch teeth; the shaft profile 20 is provided in the form of corresponding teeth which can also be referred to as shaft teeth. The clutch teeth 10 and the shaft teeth 20 each have a tooth height H10, H20 which, in a cross-sectional view, is defined by the distance between a tip circle radius and a base circle radius of the respective set of teeth. It is proposed that the tooth height H10 of the clutch teeth 10 and the tooth height H20 of the shaft teeth, at least in a portion of the respective set of teeth, increases towards the first clutch part 6. This means that under rotating conditions, the central flank lines L20, L20' of the respective set of teeth 10, 20 in any case comprise a conical face portion and, optionally, can comprise an adjoining cylindrical face portion. At least one of the sets of teeth 10, 20 can be designed such that the conical face portion of the flank line L20, L20' extends along at least half the total length of the sets of teeth.

The profile connection 29 is formed such that, when torque is being transmitted, an axial force is affected from the second drive part 9 to the second clutch part 8 towards the first clutch part 6. As a result of the axial force applied by the profile connection 29 in the closing sense, under torque transmitting conditions, the clutch 3 is prevented from opening undesirably. In particular, it is possible that the axial force which, under torque transmitting conditions, is effected by the profile teeth 29 in the closing sense, is greater than an axial force which, under torque transmitting conditions, is transmitted by the clutch 3 in the opening sense as the case may be.

Figure 6:
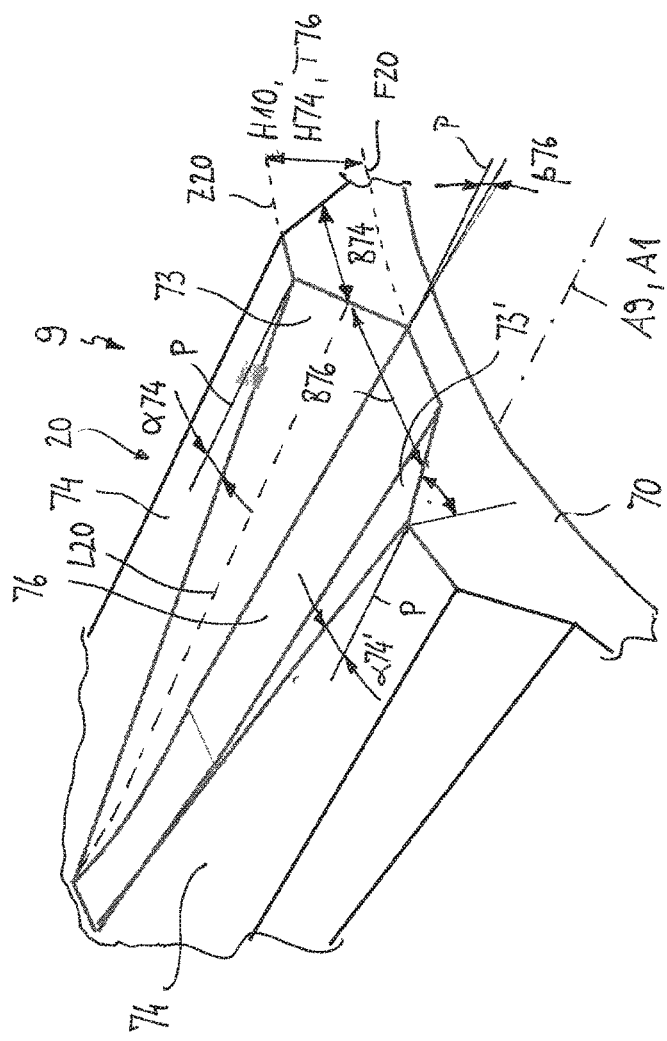
FIG. 6 shows a detail of the second drive part of the clutch assembly according to FIG. 1 in a three-dimensional illustration.

It can be seen in particular in FIG. 6 that the tooth flanks 73, 73' of the shaft teeth 74—if seen in a radial view— enclose a tooth flank angle α74 together with line P that is parallel to the rotational axis A, which angle, more particularly, is greater than 1° and smaller than 5° and in the present example amounts to approximately 3°. The same applies analogously to the clutch teeth 10, i.e. if viewed in a cylindrical section, the tooth flanks 75, 75' of the clutch teeth 10, together with a parallel P relative to the rotational axis A, enclose corresponding tooth flank angles α75, α75' which are of the same size as the tooth flank angles α74, α74' of the shaft teeth 20. In an example which is modified relative to the example shown, the tooth flank angles α75, α75' of the clutch teeth 10 can also have different sizes. This also applies to the tooth flank angles α74, α74' of the shaft teeth 74.

Overall, it is proposed that the tooth flank angles α74, α75 of the splined connection 29 between the second clutch part 8 and the driveshaft 9 are greater than the contact face angles of the clutch teeth 23, 24. In this way, the clutch 3 is held in the closing sense when torque is being transmitted.

It can also be seen in FIG. 6 that the teeth 74 of the shaft teeth 20 comprise a variable width B74 along their length, which decreases towards the free end 70 of the driveshaft 9 and towards the first clutch part 6, respectively. The tooth tip lines Z20 of the shaft teeth 20 are arranged on a cylindrical face which forms the outer face of the second driveshaft 9. However, it is also possible that the outer face of the second driveshaft 9 is conical at least in part of the toothed portion. A tooth gap 76 is formed between each two circumferentially adjoining shaft teeth 74. Towards the free shaft end 70, the tooth gaps 76 comprise an increasing depth T76 which corresponds to the tooth height H74. Because the width B74 of the teeth 74 decreases along the shaft teeth 20 towards the first clutch part 6, the width B76 of the tooth gaps 76 between two adjoining teeth increases accordingly. This example, just like the depth T76 of the tooth gaps increasing towards the first clutch part 6, allows the teeth to be produced by a forming operation, in particular by press forming, wherein a subsequent chip forming operation may not be required.

Figure 7:
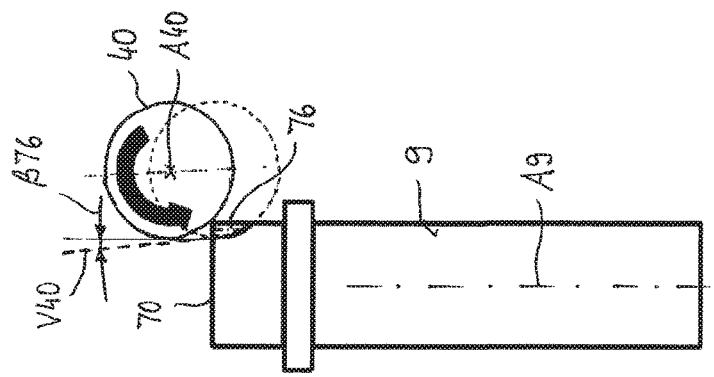
FIG. 7 shows schematically a possible production method for producing a shaft profile in one of the drive parts of the clutch assembly according to FIG. 1 in a side view.

Alternatively, the shaft teeth 20 can also be produced by milling, as shown in FIG. 7. For producing the tooth gaps 76 whose depth and width increase towards the free shaft end 70, the rotational axis of the milling tool 40 can be moved on a feeding axis A40 which extends at an angle relative to the rotational axis A of the second drive part 9. The angle 676 enclosed between the feeding axis V40 and the rotational axis A of the drive part 9 defines the extension of the tooth base lines F20 along the length of the teeth 20 which, towards the free end 70, approaches the rotational axis A.

To achieve a form-locking engagement, the design of the clutch teeth 10 corresponds to that of the shaft teeth 20. The clutch teeth 77 have a variable width B77 along their length, which width B77 increases towards the first clutch part 6. Furthermore, the height H77 of the clutch teeth 77 increases towards the first clutch part 6. The tooth height H77 is defined as the distance between the tooth tip line Z10 and the tooth base line F10, in each case it viewed in a cross-section through the teeth. The tooth tip lines Z10 of the clutch teeth 77 form a tip line face or rotational face which, with an end portion, is conically tapered towards the first clutch part 6.

The second clutch part 8 can be produced by massive forming in the form of a precision-formed component. Because of the geometry selected, there is no need for a chip forming operation.

As can be seen in particular in FIG. 5B, the face teeth 79 of the face toothing 24 of the second clutch part 8 comprise a variable width B79 along their length, which width B79 increases from the radial inside to the radial outside. Furthermore, the face teeth 79 comprise a variable height H79 along their length which reaches a maximum in the central portion 80 and which, starting from the maximum, decreases towards the radial inside and towards the radial outside. The face toothing 23 of the first clutch part 6 comprise a corresponding shape.

The brake 4 comprises a first brake part 33 which is firmly connected to the second clutch part 8, as well as a second brake part 34 which is connected to the stationary housing in a rotationally fixed way or can be connected thereto. By axially loading the second clutch part 8 away from the first clutch part 6, the brake part 33 which is connected to the second clutch part 8 and rotates jointly therewith, is loaded against the fixed brake part 34. By way of the frictional contact between the brake parts 33, 34, the first brake part 33 is decelerated until it stops. Thus all driveline parts which are drivingly connected to the brake component 33 stand still.

The first brake part 33 can be produced so as to be integral with the second clutch part 8, which is advantageous with regard to production and assembly. The second brake part 34 is produced in the form of a brake disk or friction disc which is rotationally fixed and axially supported relative to the housing 13. When the brake 4 is closed, the clutch 3 is open, so that the driveline portion which is drivingly connected to the second clutch part 8 is disconnected from the first clutch part 6. In the closed condition of the clutch 3, the brake 4 is released, so that the second clutch part 8 and all the components drivingly connected thereto can rotate freely. It can be seen that the spring means 31 load the brake 4 in the opening sense and load the clutch 3 in the closing sense. The clutch 3 and the brake 4 are actuated by the actuating device 5 which will be explained below in greater detail with particular reference to FIGS. 4 to 6.

The actuating device 5 comprises a first ring 35 which is axially supported relative to the housing 13, and thus can also be referred to as a supporting ring, as well as a second ring 36 which is axially movable when the two rings 35, 36 are rotated relative to one another. For rotating the rings 35, 36 relative to one another, there is provided an electric drive 37 and a gearing 38, with other drives such as a hydraulic, pneumatic or electro-magnetic drives also being possible. The gearing 38 comprises a pinion 30 which is rotatingly drivable by the electric motor 37 and which engages corresponding outer teeth 39 of the first ring 35. The second ring 36 comprises anti-rotation means 41 by which it is received in the housing 13 in a rotationally fixed way. For this purpose, the housing 13 is provided with longitudinal grooves 42 in which the anti-rotation means 41 are guided so as to be longitudinally displaceable.

The first ring 35 and the second ring 36 jointly form a ramp mechanism which is designed such that—starting from and end position in which the second ring 36 is arranged axially approximate to the first ring 35—the second ring 36 is axially moved away from the first ring 35 by relatively rotating the latter. For this purpose, the first and the second ring 35, 36 comprise corresponding setting contours 41, 42 by which they are axially supported against each other. In a circumferential direction, the setting contours 41, 42 comprise variable heights, so that a relative rotation of the two rings 35, 36 relative to one another is converted into an axial movement of the second ring 36. Starting from a first portion 43 with the greatest depth, upon rotation in the first rotational direction R1, the setting contours 41 of the first ring 35 initially comprise a first ramp portion 44 with a greater gradient, furthermore a circumferentially adjoining gradient-free intermediate portion 45 and an adjoining second ramp portion 46. The circumferential angle of the first ramp portion 44 is smaller than the circumferential angle of the second ramp portion 46. By this contour, upon rotation of the first disc 35 in the direction R1, there initially takes place a relatively fast axial movement of the second disc 36 towards the brake 4 when the supporting element 42 moves along the first gradient portion 44.

Each setting contour 41 of the first ring 35 is associated with a supporting element 42 of the second ring 36. In an end position of the actuating device 5, the supporting element 42 is positioned in the first portion 43 of the setting contour 42 so that the two rings 35, 36 are axially approximated to each other. In this switching condition, which is shown in FIG. 8, the clutch 3 is closed (connect mode). By relatively rotating the first ring 35 in the rotational direction R1, the supporting element 42 moves along at the gradient portion 44, so that the second ring 36 is axially loaded away from the first ring 35. Thus, the second clutch part 8 on which the second ring 36 is axially supported is loaded away from the first clutch part 6, so that the clutch 3 is opened. A completely open condition is achieved when the supporting element 42 contacts the gradient-less intermediate portion 45. This condition is shown in FIG. 9. It can be seen that the clutch 3 and the brake 4 are open. This condition can also be referred to as free-running (disconnect mode).

When the first ring 35 is rotated further in the rotational direction R1 beyond the free-running condition, the second ring 36, together with the clutch part 8 and the first brake part 33 connected thereto, is loaded towards the second brake part 34. The supporting element 42 slides along the flatter gradient portion 46 of the first ring 35 in the circumferential direction. Thereby, the two brake parts 33, 34 come into friction contact with one another, so that the rotating brake part 33 together with the components drivingly connected thereto is braked relative to the stationary housing 13. This brake mode is shown in FIG. 10. The arrows in the region of the brake 4 indicate the friction locking condition between the two brake parts 33, 34. In this condition, the second drive part 9 stands still and does not transmit any torque. This design of the ramp assembly ensures that the brake 4 is not closed until the clutch 3 is fully open.

If a renewed transmission of torque by the second drive part 9 is again required, the first ring 35 is rotated back in the opposite direction R2. Thereby, the setting element 42 moves along the gradient portion 46 into deeper regions again, so that the second brake part 33, because of the spring force of the returning spring 31, is loaded away from the brake part 34. The braking function of the second drive part 9 is thus eliminated. By rotating the first ring 35 further beyond the free-wheeling condition, the supporting elements 42 of the second ring 36 move into the respective end portion 43 of the first ring 35. In this way, the second clutch part 8 is again loaded towards the first clutch part 6 until, finally, it is fully engaged. In this condition, a transmission of torque from the first shaft 7 via the clutch 3 to the second driveshaft 9 can again take place.

Figure 4:
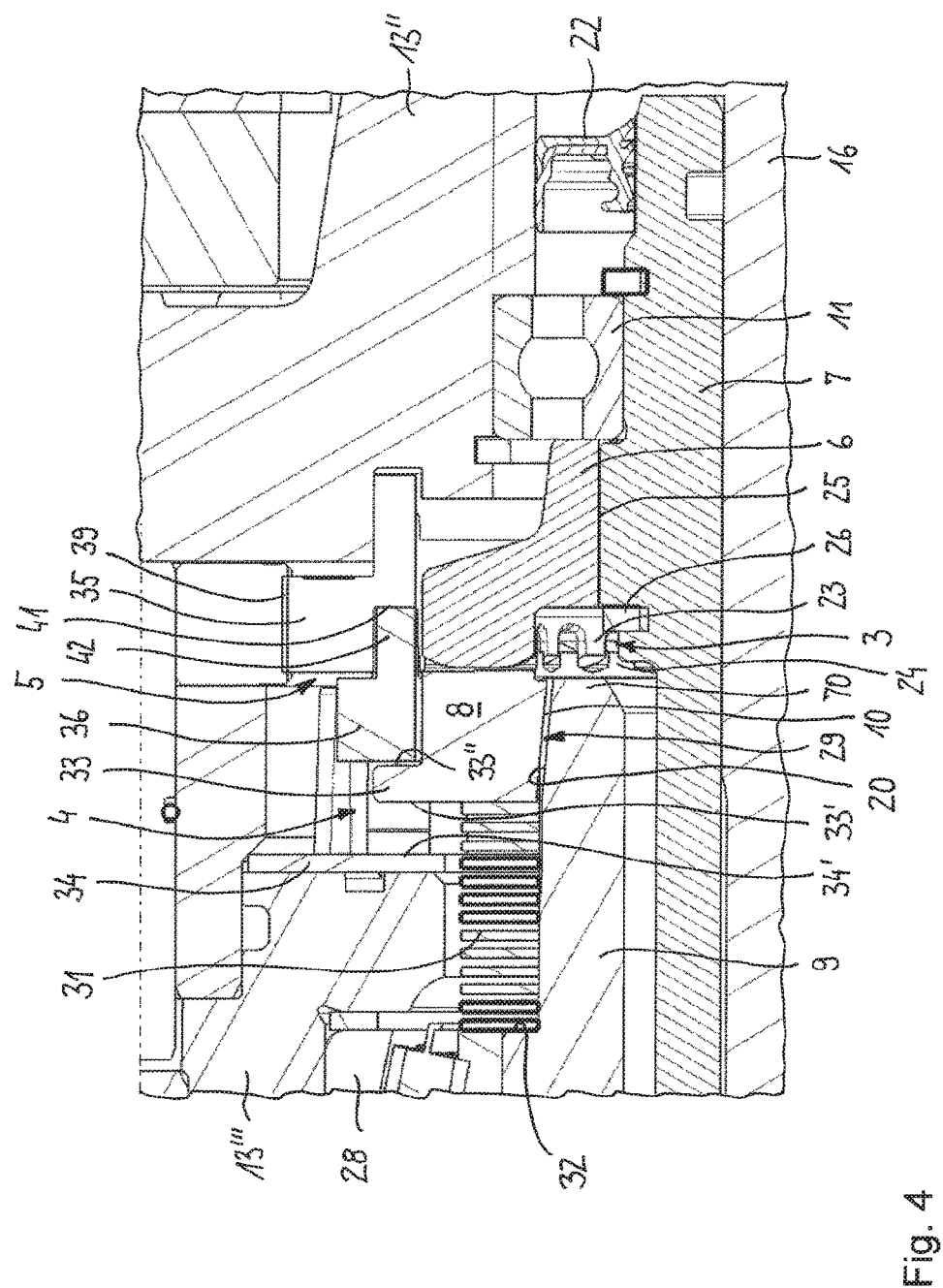
FIG. 4 shows the detail A of the clutch assembly according to FIG. 1.

Along the entire displacement path that is covered by the second clutch part 8 due to being loaded by the second ring 36 from the closed position via the freewheeling position into the braking position, the clutch teeth 10 engage the shaft teeth 20 in a rotationally fixed way. In the closed position, which is also shown in FIG. 4, the second clutch part 8 is axially loaded away from the shaft 9, so that a narrow gap is formed between the shaft teeth 20 and the clutch teeth 10. However, this gap is so small that the clutch teeth 10 continue to form-lockingly engage the shaft teeth 20. In the open or braking condition, he clutch teeth 10 axially approach the shaft teeth 20, so the size of the gap is reduced. Furthermore, it can be seen in FIG. 4 that, in a longitudinal view, the profile connection 29, starting from the end portion 70 of the driveshaft 9, comprises a first portion with a greater cone angle and an adjoining portion with a smaller cone angle. The smaller cone angle can also be zero, i.e. in this case, the second portion is a cylindrical portion. As can be seen in particular in FIG. 5D, the clutch teeth 10 have a corresponding design.

The example according to FIGS. 8 to 10 shows a ramp assembly wherein the setting contour 41 is associated with the rotatingly drivable first ring 35, whereas the supporting elements 42 are associated with the axially movable second ring 36. It is to be understood that a kinetically reversed arrangement is also possible.

FIGS. 11 to 15 which will be described jointly below, show an example clutch assembly 102 in a further example. Said example in respect of structure and mode of operation, largely corresponds to that according to FIGS. 1 to 10, so that as far as common features are concerned, reference is made to the above description. Components which correspond to one another are provided with reference numbers which are increased by the figure of 100.

The clutch assembly 102 comprises a first drive part 107, a second drive part 109 and a clutch 103 which is arranged in the power path between the two drive parts 107, 109. The clutch 103 comprises an axially supported first clutch part 106 and an axially movable second clutch part 108, wherein the second clutch part can be moved into an open position in which the first and the second clutch parts 106, 108 can rotate freely relative to one another around the rotational axis A, and into a closed position in which the two clutch parts 106, 108 engage one another in a form-locking way for transmitting torque. Between the second clutch part 108 and the second drive part 109 there is formed a profile connection 129. The profile connection 129 comprises a clutch profile 110 which is firmly connected to the second clutch part 108, as well as a drive part profile 120 which is firmly connected to the second drive part 109. The profile connection 129 is designed such that the second clutch part 108 is connected to the second drive part 109 in a rotational fixed and axially movable way. It is possible that the drive part profile 120 of the second drive part 109 comprises central flank lines which are formed between a tip line and a base line of the drive part profile, wherein the drive part profile 120 is designed such that when rotating around the rotational axis A, the central flank lines define a rotational face which comprises a tapered portion at least.

In the present example, the clutch assembly 102 forms part of a drive unit 88 which serves to drive a driving axle of a motor vehicle. In the power path behind the clutch assembly 102, the drive unit 88 comprises a differential drive 89 which distributes the introduced torque to the two sideshafts of the motor vehicle. The clutch 103 is used for optionally transmitting torque from a drive source of the motor vehicle to the sideshafts if required, or for interrupting a torque transmission.

The clutch 103 is arranged in the power path between the second drive part 109 and the first drive part 107. The second drive part 109 forms part of a differential housing which is rotatingly drivable around the rotational axis A by a drive gear 90. The first drive part 107 is provided in the form of a carrier element of the differential drive 89. For actuating the clutch 103 there is provided an actuating device (not illustrated) which is arranged coaxially around a sleeve projection 91 of the differential housing 109 and can be provided for example in the form of an electro-magnetic actuator. The differential housing 109 is produced in two parts and comprises a first housing part 92 and a second housing part 93 which, in the region of their opening-facing ends, each comprise a flange portion by which they are connected to the drive gear 90. The differential drive 89 is received in the differential housing 109 and rotatably supported around the rotational axis A.

In the carrier element 107 there are provided two bores for inserting and fixing a journal 94. Two differential gears 95 are supported on the journal 94 so as to be rotatable around a journal axis. The two differential gears 95 engage a first and a second sideshaft gear 96, 97 which are arranged coaxially relative to the rotational axis A. The two sideshaft gears 96, 97 each comprise longitudinal teeth into which corresponding counter teeth of a side shaft (not illustrated) can be inserted for torque transmitting purposes. The two sideshaft gears 96, 97 are each axially supported relative to the housing 109 by friction-reducing discs.

The clutch 103 is provided in the form of a form-locking clutch which largely corresponds to the example according to FIGS. 1 to 10, to the description of which reference is hereby made. The first clutch part 106 is firmly connected to the first drive part 107 (differential carrier), in particular so as to be integral therewith. The second clutch part 108 is connected to the second drive part 109 (differential housing) in a rotationally fixed and axially movable way. The second clutch part 108 is axially movable relative to the first clutch part 106 and can engage same for transmitting torque, so that a form-locking connection is achieved. The transmission of torque can be interrupted again by disengaging the second clutch part 108.

The second clutch part 108 comprises an annular portion 98 which is arranged inside the differential housing 109, as well as a plurality of circumferentially distributed connecting elements 99 which extend from the annular portion 98 in the axial direction. The clutch profile 110 is formed on the outer circumference of the annular portion 98 and form-lockingly engages the drive part profile 120 at an inner circumferential face of the differential housing 109. By way of the profile connection 129, the second clutch part 108 is connected to the second drive part 109 in a rotationally fixed and axially movable way. The profile connection 129 is designed such that during the transmission of torque, an axial force is applied to the second clutch part 108 in the closing sense of the clutch 103, i.e. the second clutch part 108 is loaded towards the first clutch part 106.

Figure 14:
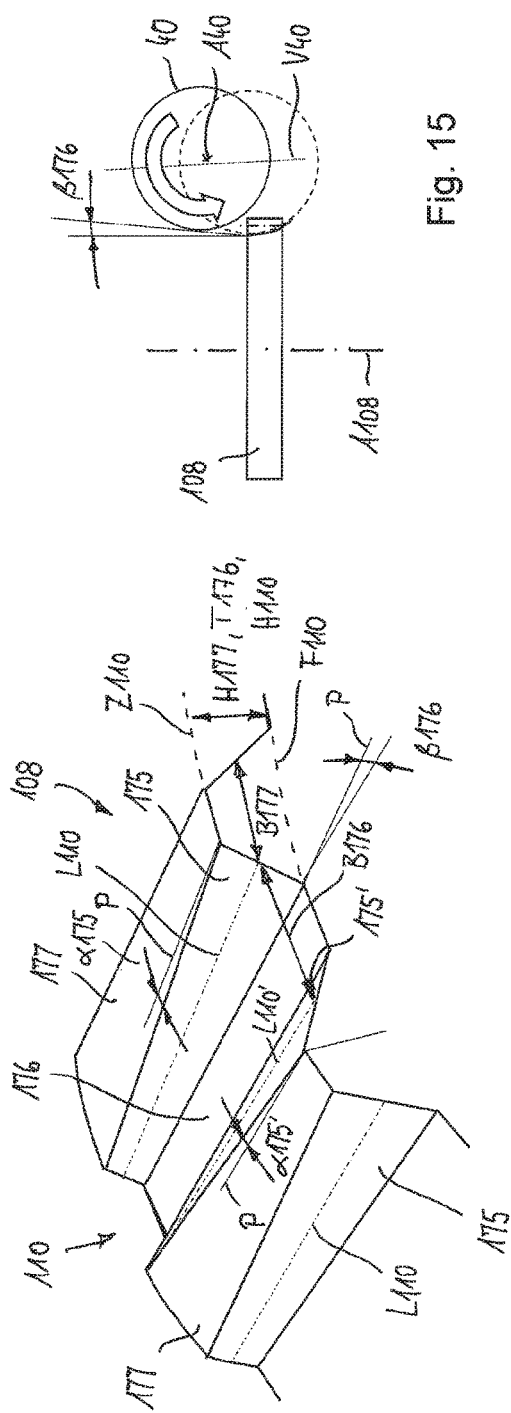
FIG. 14 shows a detail of the second clutch part of the clutch assembly according to FIG. 11 a three-dimensional view.

A section of the second clutch part 108 with an outer clutch profile 110 is shown in FIG. 14. The clutch profile is provided in the form of toothing and comprises clutch teeth 177 with tooth flanks 175, 175' and tooth gaps 176 arranged in circumferential direction therebetween. In a radial view, the tooth flanks 175, 175' enclose a respective tooth flank angle $\alpha 177$, $\alpha 177'$ with a parallel line P to the rotational axis A108, which in particular is greater than 1° and smaller than 5° and, in the present example, amounts to approximately 3°. The same applies analogously to the drive part profile 120, i.e. in a cylindrical section, the tooth flanks 173 of the drive part profile enclose corresponding tooth flank angles with a parallel P to the rotational axis A, which are of the same size as the tooth flank angles $\alpha 177$, $\alpha 177'$ of the clutch teeth 110. The tooth flank angles of the profile connection 129 between the second clutch part 108 and the second drive part 109 are greater than the contact face angles of the clutch teeth 123, 124.

The teeth 177 of the clutch toothing 110 have a variable width B177 along their length, which increases towards the first clutch part 106. The tooth tip lines Z110 of the clutch teeth 110 are located on a cylindrical face which forms the outer face of the second clutch part 108, wherein the outer face, in at least a partial portion, can also be conical. Between each two circumferentially adjoining clutch teeth 177 there is formed a tooth gap 178. The tooth gaps 176 have a depth T176 which decreases towards the first clutch part 106 and which corresponds to the tooth height H175. Because the width B177 of the teeth 177 increases along the clutch teeth 110 towards the first clutch part 106, the width B176 of the tooth gaps 176 arranged therebetween decreases accordingly. The base area of a tooth gap 176, which defines the tooth base line F110, comprises a constant width along its length. The sum of all base areas forms a face which is conical relative to the rotational axis.

Figure 15:
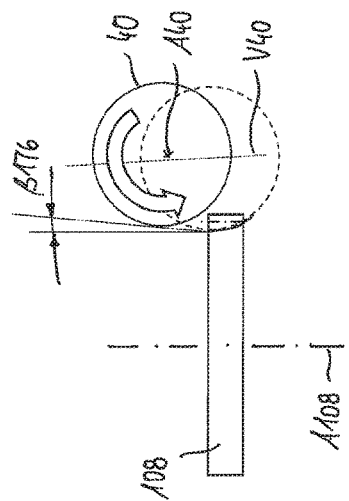
FIG. 15 shows schematically a possible production method for producing a clutch profile for the clutch assembly according to FIG. 11 in a side view.
Figure 13:
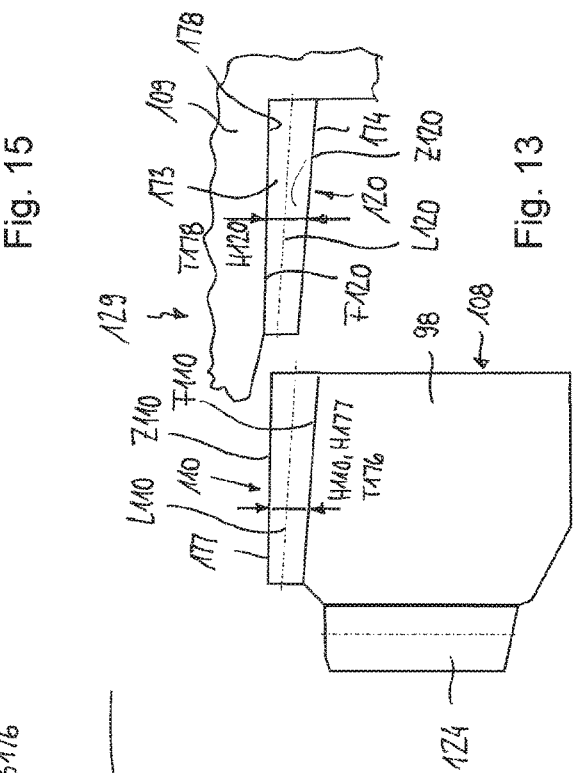
FIG. 13 shows the profile connection of the clutch assembly according to FIG. 11 as a detail.

The clutch profile 110 can be produced by milling for example, as shown in FIG. 15. To produce the tooth gaps whose depth and width increases, the rotational axis A40 of the milling tool 40 can be moved on a forward feed axis A40 which extends at an angle relative to the rotational axis A108 of the second clutch part 108. The angle 6176 enclosed between the forward feed axis V40 and the rotational axis A108 defines the extension of the tooth base lines F110 along the length of the profile teeth 110. The tooth base lines F110 move away from the rotational axis A108 towards the first clutch part 106, which can be seen in particular in FIG. 13. The drive part 120 of the differential housing 109 can be designed to correspond to the clutch profile 110. As far as further details regarding the design and mode of operation of the profile connection 129 are concerned, reference is also made to the description of the example according to FIGS. 1 to 10, which applies analogously to the example of FIGS. 11 to 15.

The connecting elements 99 extend in the axial direction through circumferentially distributed apertures in the differential housing 109 and are provided in the form of bolts which, at one end, are threaded into an end face of the second clutch part 108, and at their other end they are connected to a carrier element 100. The carrier element 100 is provided in the form of a disc and can serve as a target element for a sensor for sensing the switching position of the clutch 103. Between the carrier element 100 and the second drive part 109 spring elements 131 are provided which load the clutch 103 into the open position. For closing the clutch 103 the actuating device is attached which acts on the carrier element for axially moving same against the spring force of the spring 131 towards the first clutch part 106.

Figure 16:
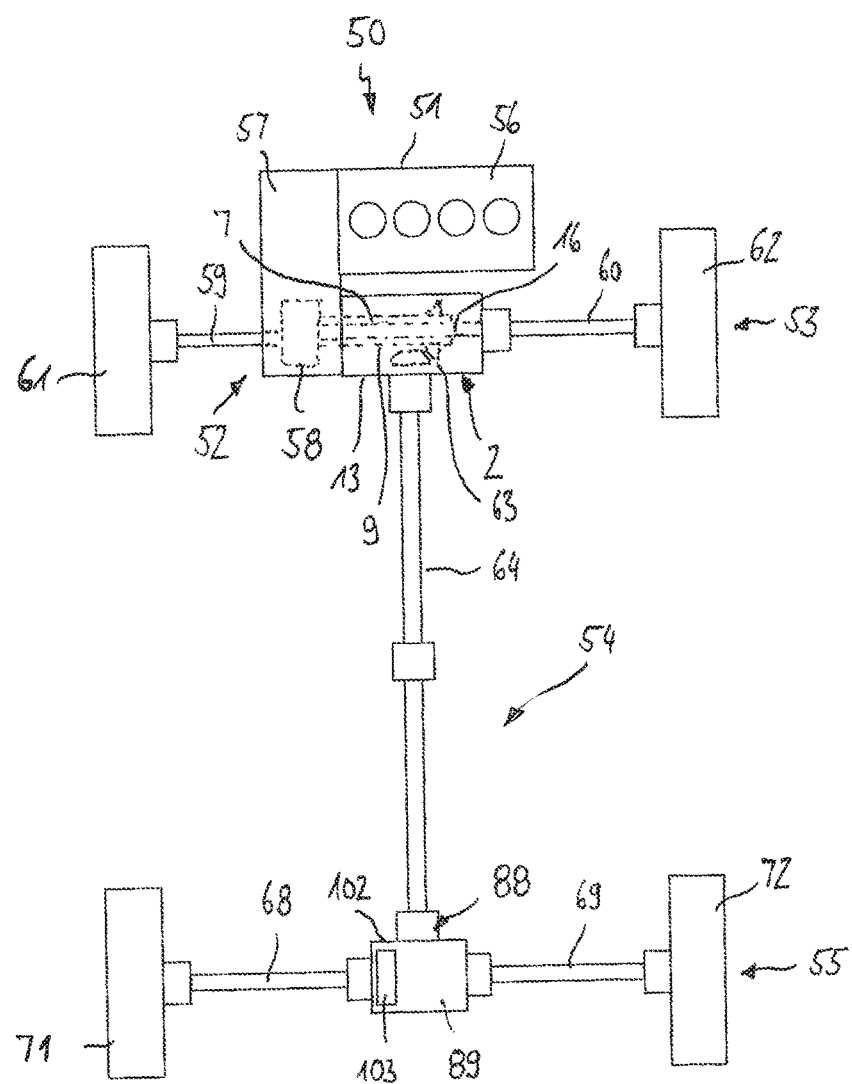
FIG. 16 shows an example driveline assembly having an example clutch assembly according to FIGS. 1 to 10 and FIGS. 11 to 15, respectively.

FIG. 16 schematically shows an example driveline assembly 50 having an example clutch assembly 2 according to FIGS. 1 to 10, as well as an example clutch assembly 102 according to FIGS. 11 to 15. It is to be understood that the driveline assembly 50 can also comprise only one of the two inventive clutch assemblies 2, 102. The driveline assembly 50 comprises a drive unit 51, a first driveline 52 for driving a first driving axle 53 and a second driveline 54 for driving a second driving axle 55. The drive unit 51 comprises an internal combustion engine 56 and a multi-step transmission 57 via which torque is introduced into the first and the second driveline 52, 54. It is to be understood that the drive unit 51 can also be any other types of drive, for example an electric motor.

For distributing the torque generated by the drive unit 51 to the two drivelines 52, 54, there is provided a transfer case 58 which can be provided in the form of a differential drive. The transfer case box 58 is connected to the inventive clutch assembly 2 which can be designed according to FIGS. 1 to 10. For this purpose, the stationary housing 13 is connected via the connecting portion 14 to the housing of the transmission 57. The through-driveshaft 16 is connected to the first output part of the transfer case 58, whereas the first shaft 7 is drivingly connected to a second output shaft of the transfer case 58. The first driveline 52 comprises the sideshafts 59, 60 which are drivingly connected to the transfer case 58 and via which the introduced torque is transmitted to the associated wheels 61, 62.

Via the example clutch assembly 2 which can also be referred to as power take-off unit, part of the torque can be transmitted from the first shaft 7 to the second driveshaft 9, with the clutch 3 being in a closed position. The second driveline 54 is driven via the second driveshaft 9 and comprises the following components which are drivingly connected to each other in series for transmitting torque: an angle drive 63, a propeller shaft 64, a second angle drive 65, a second clutch assembly 102, and a second axle differential 89 which, via sideshafts 68, 69, drives the wheels 71, 72 of the second driving axle 55.

The angle drive 63 comprises a ring gear 83 which is rotationally fixed to the second driveshaft 9, as well as a bevel gear 84 which, via a constant velocity joint 85, is connected to the propeller shaft 64. The bevel gear 84 is rotatingly supported via rolling contact bearings 86, 87 in a sleeve projection of the housing 13 around a rotational axis A2. The rotational axis A2 extends perpendicularly to the rotational axis A1 of the second driveshaft 9 and the ring gear 73, respectively.

A feature of the driveline assembly 50 is that, when the clutch 3 of the first clutch assembly 2 and the clutch 103 of the second assembly 102 are open, the driveline arranged in the power path between the two clutches 3, 103 can be switched so as to be torque-free. By means of the clutch 3, the second driveshaft 9 and the components drivingly connected thereto, can be transferred into a torque transmitting or torque-free condition. In the torque-free condition, the brake 4 of the first clutch assembly 2 makes it possible that the driveline stands still completely, thus reducing any performance losses due to drag moments and friction. This, in turn, leads to a reduction in fuel consumption for those driving conditions in which only the first driving axle is driven, with the second driving axle running in a torque-free condition. A further advantage of the example clutch assemblies 2, 102 refers to the example of the profile connections 29, 129 which comprise conical partial faces. This allows the profiles to be produced in particular by a forming method, with the option of eliminating a chip-forming post-processing.

The invention claimed is:

1. A clutch assembly for a driveline of a motor vehicle, comprising:
    a first drive part;
    a second drive part; and
    a clutch that comprises an axially supported first clutch part and an axially movable second clutch part, wherein the second clutch part is movable into an open position in which the first and the second clutch part are freely rotatable relative to one another around a rotational axis, and into a closed position in which the first and the second clutch part are form-lockingly engaged to transmit torque;
    wherein a clutch profile of the second clutch part and a drive part profile of the second drive part form a form-locking profile connection such that the second clutch part is connected to the second drive part in a rotationally fixed and axially movable way;
    wherein the drive part profile of the second drive part comprises central flank lines which are each formed between a tip line and a base line of the drive part profile; and
    wherein the central flank lines of the drive part profile, when rotating around the rotational axis, define a rotational face which comprises at least a tapered portion, wherein the clutch profile and the drive part profile are formed such that upon torque transmission an axial force is exerted from the second drive part onto the second clutch part towards the first clutch part.

2. A clutch assembly according to claim 1, wherein the drive part profile comprises a plurality of profile elements to which at least one of the following applies:
    the profile elements comprise a variable width along their length, the width decreasing towards the first clutch part;
    the profile elements form tooth tip lines of the drive profile, wherein the tooth tip lines are positioned on a cylindrical outer face of the second drive part; and
    profile gaps are formed between the profile elements, wherein the profile gaps comprise a variable depth along the length, which increases towards the first clutch part.

3. A clutch assembly according to claim 1, wherein the clutch profile comprises a plurality of clutch profile elements for which at least one of the following applies:
    the clutch profile elements comprise a variable width along the length, the width increasing towards the first clutch part;
    tip lines of the clutch profile elements form a tip line face which is conically tapered towards the first clutch part; and
    the clutch profile elements comprise a variable height along the length, the height increasing towards the first clutch part.

4. A clutch assembly according to claim 1, wherein the drive part profile comprises a plurality of profile elements to which at least one of the following applies:
the profile elements comprise a variable width along the length, the width decreasing towards the first clutch part;
the profile elements form tooth tip lines of the drive profile, wherein the tooth tip lines are arranged on a conical inner face of the second drive part; and
profile gaps are formed between the profile elements, wherein the profile gaps have a variable depth along the length, the depth increasing towards the first clutch part.

5. A clutch assembly according to claim 1, wherein the clutch profile comprises a plurality of clutch profile elements for which at least one of the following applies:
the clutch profile elements comprise a variable width along the length, the width increasing towards the first clutch part;
tip lines of the clutch profile elements form a tip line face which is cylindrical or widens conically towards the first clutch part; and
the clutch profile elements have a variable height along the length, the height decreasing towards the first clutch part.

6. A clutch assembly according to claim 3, wherein, in a cylindrical section of the clutch profile, a profile flank angle is included between a profile flank of at least one of the clutch profile elements and a parallel line to the rotational axis, wherein said profile flank angle is greater than 1° and smaller than 5°.

7. A clutch assembly according to claim 1, wherein the profile connection is a splined connection with inter-engaging shaft teeth and clutch teeth, wherein the shaft teeth and the clutch teeth each comprise at least a partial face that is conical.

8. A clutch assembly according to claim 6, wherein first engaging elements of the first clutch part and second engaging elements of the second clutch part engage one another in the closed position and contact each other at engaging faces to transmit power, and wherein, in a cross-section through the engaging elements, the engaging faces enclose respective engaging face angles with a longitudinal plane that includes the rotational axis, wherein at least one of the engaging face angles is smaller than at least one of the profile flank angles.

9. A clutch assembly according to claim 8, wherein the first and the second engaging elements are face toothings that are formed in opposed end faces of the first and the second clutch part, and wherein for at least one of the face toothings at least one of the following applies:
face teeth of the face toothing have a variable width along the length, the width increasing from a radial inside to a radial outside; and
the engaging faces are tooth flanks of the face teeth which extend at an angle relative to one another in a cross-section through the face toothing.

10. A clutch assembly according to claim 1, further comprising:
a brake arranged to brake the second drive part relative to a stationary component; and
an actuating device arranged to actuate the clutch and the brake.

11. A clutch assembly according to claim 10, wherein the actuating device comprises a ramp mechanism with an axially supported first ring and an axially movable second ring, the second ring being axially displaceable relative to the first ring when the first and the second ring are rotated relative to one another by a drive,
wherein the actuating device is designed such that, starting from an end position in which the first ring and the second ring are axially related to one another, the clutch is opened by relatively rotating the first ring relative to the second ring, in a first rotational range, and wherein, upon further rotation in a same rotational direction, the brake is closed in a second rotational range.

12. A clutch assembly according to claim 1, wherein the second drive part is a differential housing that is rotatingly drivable around the rotational axis by a drive gear, and
wherein the first drive part is a differential carrier that is arranged in the differential housing so as to be rotatable around the rotational axis;
wherein the clutch is arranged in the power path between the differential housing and the differential carrier, so that a transmission of torque from the differential housing to the differential carrier can selectively be effected or interrupted;
wherein the first clutch part of the clutch is firmly connected to the differential carrier and the second clutch part of the clutch is held in a rotationally fixed and axially movable way relative to the differential housing;
wherein an actuating device is provided for actuating the clutch.

13. A clutch assembly according to claim 12, wherein the second clutch part comprises an annular portion arranged in the differential housing, and a plurality of connecting elements which extend from the annular portion axially outwardly through openings in the differential housing,
wherein the clutch profile is formed at an outer circumferential face of the second clutch part, and wherein the drive part profile is provided at an inner circumferential face of the differential housing.

14. A clutch assembly according to claim 1, wherein an angular drive is provided with a ring gear and a bevel gear, which engage each other to transmit torque, wherein the second drive part is firmly connected to the ring gear and is rotatably supported coaxially to the first drive part.

15. A driveline assembly for a motor vehicle, comprising:
a permanently drivable first driveline with a first driving axle,
an optionally drivable second driveline with a second driving axle,
wherein the second driveline comprises a first clutch assembly, a second clutch assembly and a driveshaft which is arranged in the power path between the first and the second clutch assembly, wherein at least one of the first and the second clutch assembly comprises:
a first drive part;
a second drive part; and
a clutch that comprises an axially supported first clutch part and an axially movable second clutch part, wherein the second clutch part is movable into an open position in which the first and the second clutch part are freely rotatable relative to one another around a rotational axis, and into a closed position in which the first and the second clutch part are form-lockingly engaged to transmit torque;
wherein a clutch profile of the second clutch part and a drive part profile of the second drive part form a form-locking profile connection such that the second clutch part is connected to the second drive part in a rotationally fixed and axially movable way;

wherein the drive part profile of the second drive part comprises central flank lines which are each formed between a tip line and a base line of the drive part profile; and wherein the central flank lines of the drive part profile, when rotating around the rotational axis, define a rotational face which comprises at least a tapered portion, wherein the clutch profile and the drive part profile are formed such that upon torque transmission an axial force is exerted from the second drive part onto the second clutch part towards the first clutch part.

\* \* \* \* \*